United States Patent
Popp et al.

Patent Number: 5,822,177
Date of Patent: Oct. 13, 1998

[54] ELECTROLYTIC CAPACITOR WITH FRACTAL SURFACE

[75] Inventors: Thomas Popp, Nuremberg; Armin Bolz, Erlangen, both of Germany

[73] Assignee: Biotronik Mess-Und Therapiegerate GmbH & Co. Ingenieurburo Berlin, Berlin, Germany

[21] Appl. No.: 678,138

[22] Filed: Jul. 11, 1996

[30] Foreign Application Priority Data

Jul. 11, 1995 [DE] Germany .......... 195 25 143.1

[51] Int. Cl.⁶ ........................................ H01G 9/042
[52] U.S. Cl. .................. 361/508; 361/509; 361/519; 361/529
[58] Field of Search .................. 361/500, 503, 361/508–512, 514, 537, 516, 517, 519, 520, 523–526, 528–530, 532, 535; 29/25.03; 607/13, 9, 11

[56] References Cited

U.S. PATENT DOCUMENTS

| 2,900,579 | 8/1959 | Rogers | 361/509 |
| 3,244,946 | 4/1966 | Hilton | 361/509 |
| 3,302,073 | 1/1967 | Broodo | 361/509 |
| 3,919,604 | 11/1975 | Alwitt et al. | 361/512 |

FOREIGN PATENT DOCUMENTS

| 4209910 | 9/1993 | Germany . |
| 9302739 | 2/1993 | WIPO . |
| WO93 02739 | 2/1993 | WIPO . |

OTHER PUBLICATIONS

Mengue et al., "Experimental Data on the Dynamic Behaviour of a Metal Capacitor With Fractal Structure", vol. 140, No. 1, pp. 201–206, Nov. 16, 1993.
Japanese Patent Abstract, 4–2109 A., E–1187, Apr. 9, 1972, vol. 16, No. 142.
Japanese Patent Abstract, 6–5476 A., E–1534, Apr. 7, 1994, vol. 18, No. 199.
Witten et al, Physical Review B, vol. 27, No. 9, p. 5686, May 1, 1993.
A. Bolz, Technologisch realisierbare Losungen, pp. 64–81, Berlin, 1995.

*Primary Examiner*—Kristine L. Kincaid
*Assistant Examiner*—Anthony Dinkins
*Attorney, Agent, or Firm*—Browdy and Neimark

[57] ABSTRACT

An electrolytic capacitor, in particular a tantalum electrolytic capacitor, is provided with a metal anode, in particular a sintered tantalum anode (1), a non-conducting insulating layer applied on it by means of molding the metal anode (1) for forming the dielectric of the electrolytic capacitor, an electrolyte in liquid, pasty or solid form, which forms the cathode of the electrolytic capacitor, and a flat cathode contact (5, 17) for providing current to the electrolyte. The flat cathode contact (5, 7) is provided with an electrically conducting, fractal surface coating (6), at least in the area of its contact surface with the electrolyte.

16 Claims, 4 Drawing Sheets

ELECTROLYTIC CAPACITOR WITH FRACTAL SURFACE

BACKGROUND OF THE INVENTION

1. Field of the Invention

The invention relates to an electrolytic capacitor, and in particular a tantalum electrolytic capacitor with a metal anode, a non-conducting insulating layer, applied to the metal anode by forming the same, for producing the dielectric of the electrolytic capacitor, an electrolyte in liquid, pasty or solid form constituting the cathode of the electrolytic capacitor, and a flat cathode contact for supplying current to the electrolyte.

2. Description of the Related Art

Electrolytic capacitors, such as are known in many structural shapes and sizes from the prior art, usually consist of a metal anode, for example a sintered tantalum anode or an aluminum anode foil, on which a thin, non-conducting insulating layer for producing the dielectric of the electrolytic capacitor is applied by so-called forming—i.e. generally by means of an electrolysis process or anodic oxidation—. In the case of a tantalum anode, the insulating layer consists of tantalum pentoxide. With an aluminum electrolytic capacitor the insulating layer is formed of aluminum oxide.

The cathode of the electrolytic capacitor consists of a liquid or pasty electrolyte in the form of an ion conductor, for example diluted sulfuric or phosphoric acid with a tantalum capacitor, or tartrate or borate solutions in ethylene glykol with an aluminum electrolytic capacitor. A solid electrolyte in the form of an electron conductor is also conceivable.

A flat cathode contact is provided for supplying current to the electrolyte which, in a known manner, can be a metal foil or the housing cup of the capacitor.

In comparison with capacitors of a different construction, known electrolytic capacitors already have the advantage of a very great specific capacity. The great storage capability as a result of this, along with a small structural volume, is the result of the extremely small electrode distance in the capacitor, which is determined by the thickness of the dielectric insulating layer, i.e. the oxide layer.

The miniaturization of components and devices is today a development goal in the field of microelectronics, which plays an important role, particularly in connection with biomedical technology, in the construction of implantable devices—such as cardiac pacemakers. While it was possible in the past years to make active components continuously smaller in the course of an increasing integration density, only comparatively little progress was made in connection with passive components, and in particular with high voltage capacitors. In spite of the application of various tricks, such a roughening the anode electrode, the limit of the achievable energy density in electrolytic capacitors at present lies in the range of 2 J/cm$^3$.

This limitation is based on the problem that electrolytic capacitors, and wet electrolytic capacitors in particular, consist of an electro-chemically oxidized—i.e. formed—anode and a cathode contact, which are dipped into a mainly aqueous electrolyte. The electrical equivalent circuit diagram of such an arrangement can be described by the series connection of an anodic capacitance $C_A$, an ohmic series resistance RESR and a cathodic capacitance $C_K$. If a high voltage U of several hundred Volt is applied to a corresponding capacitor, it primarily falls off at the oxide film of the anode. The following applies:

$$U_A = U - U_K \approx U$$

The cathode contact mostly consists of a non-formed electrode or one molded at a low voltage. It can therefore only be polarized at voltages below 1 V (without oxide layer) or a few Volts (with a thin oxide layer) in order to prevent the decomposition of the electrolyte. The capacitance $C_K$ of the cathode contact must be selected to be suitable for this. The following applies:

$$Q_A = C_A U_A;\ Q_K = C_K U_K \tag{1}$$

$$Q_A = Q_K \tag{2}$$

$$(1) \text{ in } (2): C_K = C_A U_A / U_K \tag{3}$$

SUMMARY OF THE INVENTION

For a capacitor with an operational voltage of 200 V and a capacitance of 150 μF this means that an unformed cathode contact must have a capacitance of at least 30 mF. The surface of a smooth cathode contact then must be at least 1000 cm$^2$. In conventional electrolytic capacitors the cathode contacts therefore mostly reach the dimensions of the anodes, which with conventional electrolytic capacitors naturally has disadvantageous effects on the structural size and the energy density attainable therewith.

Based on the described problems, it is the object of the invention to further develop an electrolytic capacitor of the type in accordance with the species in such a way that the achievable energy density can be considerably increased or, in the reversed way—at a predetermined capacitance value—the structural size of the corresponding capacitor can be considerably reduced.

This object is attained by means of the invention, in accordance with which the flat cathode contact of the capacitor is provided with an electrically conducting, fractal surface coating, at least in the area of its contact surface.

A fractal surface coating of this kind is distinguished in that a considerable surface increase of a geometric base surface takes place because of the fractal surface coating. This is based on the consideration of raising the surface increase of one and the same basic structure to a higher power by the continuous repetition provided by this surface increase. The electrode surface can be increased by a defined percentage by means of the application of a defined base structure to the geometric base surface. If the surface created in this manner is now taken as the new point of departure and the same structure—however, in a reduced form—is again superimposed on it, there is again an increase in the active surface. A morphology with fractal, i.e. self-resembling, properties is generated by means of a continuous repetition of this process, whose electro-chemically active surface is determined by the geometric base surface, the surface increase factor per reproduction and the number of the reproduction steps. It is possible in this way to increase the electro-chemically active surface of an electrode practically and theoretically by several orders of magnitude.

Cathode sputtering has emerged as the technological process for creating such fractal surfaces. Details regarding this can be found in the book "Die Bedeutung der Phasengrenze zwischen alloplastischen Festkörbrpern und biologischen Geweben fur die Elektrostimulation" [The Importance of the Phase Boundary between Alloplastic Solid Bodies and Biological Tissues for ElectroStimulation], author: Dr. A. Bolz, Schiele und Schön, publishers, Berlin, 1995, wherein the principle of the fractal electrode and the technical solution for producing fractal surface coatings is thoroughly described on pages 65 to 81. The disclosed content of this publication is included in the instant application by way of reference in the same way as the content of an article by T. A. Witten et al., "Diffusion-Limited Aggregation" in PHYSICAL REVIEW B, Vol. 27, No. 9, p. 5686, of May 1, 1983. This treatise deals with the basics of coating growth. In the process a general explanation is provided of how matter can grow together with the creation of which structures. It becomes particularly clear that fractal coating growth is possible under certain growth conditions, wherein the application process established as such—for example a sputter process (or PVD process)—need not be expanded past what is given. Instead, only special parameters need to be selected in the course of the otherwise established process.

It should furthermore be pointed out that electrodes with fractal surface coatings are already known as cardiological stimulation electrodes for use in cardiac pacemaker technology. Reference is made to the PCT Application WO 93/02739.

Fractal surface coatings with a specific capacitance of up to 70 mF/cm$^2$ can be advantageously produced by applying an iridium, tantalum or aluminum coating to, for example, a titanium, tantalum or aluminum substrate having a typical thickness of 5 to 10 $\mu$m by cathode sputtering. The substrate can be constituted by the housing cup of the capacitor or by a cathode foil. Such coated foils are very well suited as cathodes in wet electrolytic capacitors. The above mentioned required capacitance of 30 mF can be achieved in this case on a surface of less than 1 cm$^2$ at a negligible volume on an order of magnitude of 0.001 cm$^3$. If, for example, such a cathode contact is combined with a sintered tantalum anode produced in accordance with the customary process by sintering tantalum powder in a high vacuum at 2000° C. and anodizing in diluted acids, electrolytic capacitors with an energy density of approximately 4 J/cm$^3$ can be produced. In this case the energy density corresponds approximately to the energy density of the anode.

The following are advantageous parameters for applying a fractal coating to the cathode contact by cathode sputtering: the effects of the process pressure p and the substrate target distance d are linked via the mean free path length of the particles in the cathode sputtering reactor. For this reason the so-called pd product, whose preferred value is approximately 0.5 mbar·cm, is mostly used as a measurement for all the reactions wherein the conveyance of the particles in the gaseous phase is crucial.

The resistance to shorts of the electrolytic capacitor in accordance with the invention is improved by means of an electrically insulating separating foil in the capacitor.

The use of a fractally coated tantalum cathode contact is preferred with electrolytic capacitors in which sintered tantalum anodes are employed for reasons of the desired uniformity of the material of the anode and cathode.

However, a fractal cathode contact can also be employed in an aluminum electrolytic capacitor. But in this case it is necessary to take the peculiarities of aluminum capacitors into consideration.

First, it is not possible to produce sinter bodies of the required purity because of the low melting point of aluminum. For this reason anodes made of an etched aluminum foil have become predominant. Second, no strongly acidic electrolytes with high conductivity can be employed in aluminum capacitors. Therefore the distance between anode and cathode contact must be kept as narrow as possible in order not to excessively increase the series resistance $R_{ESR}$ mentioned at the outset. An anode foil and a cathode foil of the same dimensions, which are insulated by a layer of paper, are therefore rolled up in conventional aluminum capacitors. The volume of the anode and the cathode contact are almost the same here.

In a further preferred embodiment of an aluminum capacitor the anode foil is repeatedly folded. The cathode foil which is reduced in its geometric surface—compared with conventional capacitors—is rolled up with the anode foil and a separating foil. The anode foil is perforated in order to assure the unhampered diffusion of the ions from the various anode foil layers to the cathode foil. It is possible in this way to keep the diffusion path in the electrolyte short in spite of the reduced dimensions of the cathode. The volume of the cathode contact and the separating foil in this case is considerably reduced in comparison with conventional capacitors.

The leakage current of the capacitor in a voltage range above 200 V is clearly reduced by means of the also provided nitrogen doping of the tantalum anode of an electrolytic capacitor in accordance with the invention. Crystallization of the anodic tantalum oxide, such as often occurs with voltages above 200 V, is also effectively prevented without increasing the leakage current.

Further characteristics, details and advantages of the invention ensue from the subsequent description, in which exemplary embodiments of the subject of the invention will be explained in detail by means of the attached drawings.

DETAILED DESCRIPTION OF THE PREFERRED EMBODIMENTS

Figure 1:
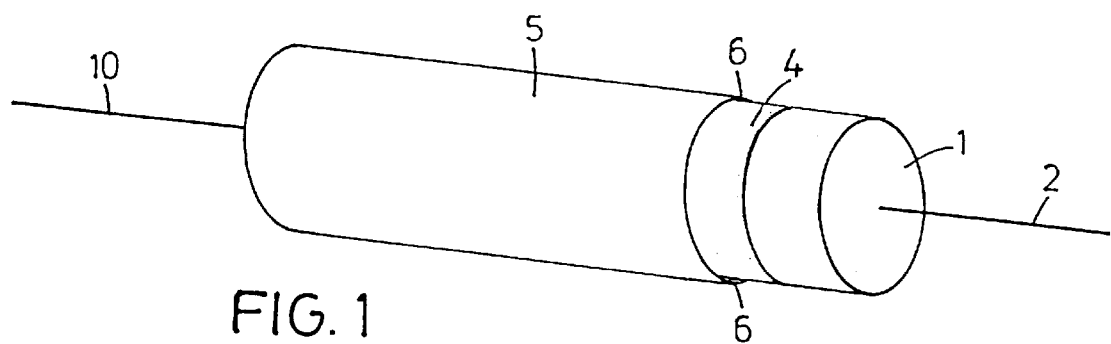
FIG. 1. is a schematic, partially broken-open perspective view of an electrolytic capacitor in a first embodiment of the present invention.
Figure 2:
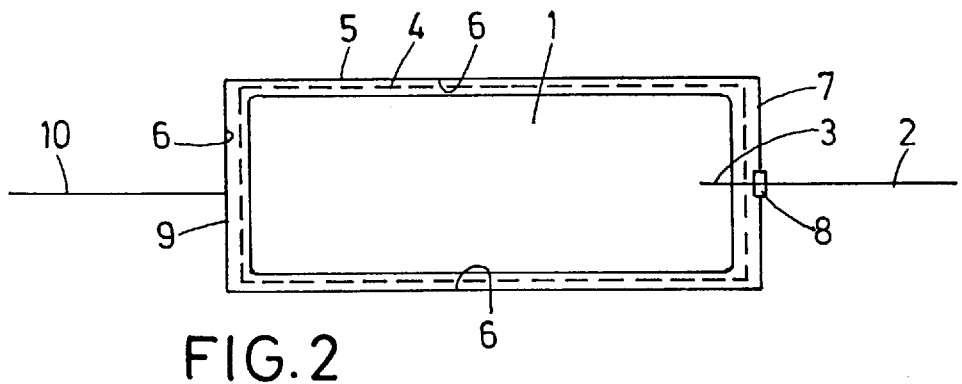
FIG. 2. is a schematic longitudinal axial section through the capacitor shown in FIG. 1.

The electrolyte capacitor represented in FIGS. 1 and 2 has the cylindrical structural shape customary with wet electrolytes. Its tantalum anode 1 is therefore cylinder-shaped and produced by compressing tantalum powder with an organic binder, such as camphor, and subsequent sintering in a high vacuum at approximately 2000° C. The end 3 at the anode side of the connecting wire 2 made of tantalum is pressed into the body of the tantalum anode 1 and permanently connected therewith prior to sintering.

Nitrogen-hardening of the sintered tantalum anodes as provided in accordance with the invention is performed after the actual sintering process as follows:

Following the sintering process, the hot anode is exposed to a nitrogen atmosphere at a typical process pressure of 1 mbar. In the process, nitrogen is partially chemically bonded in the form of tantalum nitride and partially physically dissolved as diatomic nitrogen molecules in the tantalum metal, for which the so-called "getter effect" is responsible. The nitrogen atmosphere is subsequently pumped out again.

The tantalum nitride, preferably formed on the surface, diffuses into the body of the sinter anode in a second tempering step at temperatures between 1000° and 2000° C. and a process pressure below $10^{-5}$ mbar. The physically dissolved nitrogen is also reacted into tantalum nitride. Surplus dissolved nitrogen is again given off by the sinter anode during this heat treatment and pumped out. Evaporation of the tantalum nitride formed does not occur because of the high melting and boiling temperature of this compound.

It has been shown that the leakage current in the voltage range above 200 V can be clearly lowered by means of the nitrogen-hardening of sinter anodes made of tantalum. It is possible by this means to achieve higher molding voltages for generating the dielectric, which leads to an increase in the rated voltage of the electrolytic capacitor. This is of particular advantage in connection with the employment of such capacitors in cardiac pacemakers and defibrillators. The latter devices must provide voltages on an order of magnitude of more than 100 V in order to be able to effectively combat tachycardia of the heart.

A tantalum pentoxide coating (not shown) has been applied to the tantalum anode 1—as mentioned—by forming, which constitutes the dielectric of the capacitor.

As can be seen from FIG. 2 in particular, the tantalum anode 1 is enclosed on all sides by a porous, electrically insulating separating foil 4 (shown in dashed lines in FIG. 2), which is saturated with an acidic electrolyte, such as 1- to 2-molar phosphoric or sulfuric acid. The acidic electrolyte assures the sufficient conductivity of the cathode of the capacitor which it forms.

The separating foil 4 is made of a chemically inert material in order to assure a good stability of the capacitor over time, wherein glass fiber paper or a PTFE diaphragm have been shown to be successful.

The tantalum anode 1, with the separating foil 4 enveloping it, is inserted into a cylindrical housing cup 5, open on one side, whose inside forms a flat cathode contact of the capacitor for the current supply for the electrolyte in the separating foil 4. Here and in the following claims, "flat" does not mean planar, but rather smooth or locally planar. For example, the cylindrical housing cup 5 (the shape is seen in FIG. 1), described above as "flat", is actually non-planar but smooth. The housing cup 5 is also made of tantalum. Titanium or other metals are also conceivable as material for the housing cup 5.

The housing cup 5 is provided with a fractal iridium coating 6 on its interior—i.e. in the area of the contact surface with the electrolyte—, which is indicated in this drawing figure by short dashes. This iridium coating 6 was produced by means of cathode sputtering at a pressure p of 0.1 mbar, a substrate target distance d of approximately 5 cm and at room temperature, as described in the above cited reference to Dr. A. Bolz. Thus, the so-called pd product is approximately 0.5mbar·cm. Because of the fractal iridium coating, the cathode contact of the capacitor constituted by the housing cup 5 has an electro-chemically active surface which is larger by 2 to 3 orders of magnitude than the geometric surface of its interior, which leads to the increase in capacitance of the cathode contact mentioned at the outset and thus to the achievable energy density of the capacitor.

As can be furthermore seen from FIG. 2, the open side of the housing cup 5 is closed by a cover 7, through which the connecting wire 2 enters the cup interior via an electrically insulating passage. A short circuit between the sinter body of the tantalum anode 1 and the housing cup 5 is effectively prevented with the aid of the insulating passage 8 and the separating foil 4 enveloping the tantalum anode 1 on all sides.

A cathode connecting wire 10 for electrically contacting the housing cup 5 constituting the cathode contact of the capacitor is fastened in an electrically conducting manner centrally on the outside of the bottom 9 of the housing cup 5.

Figure 3:
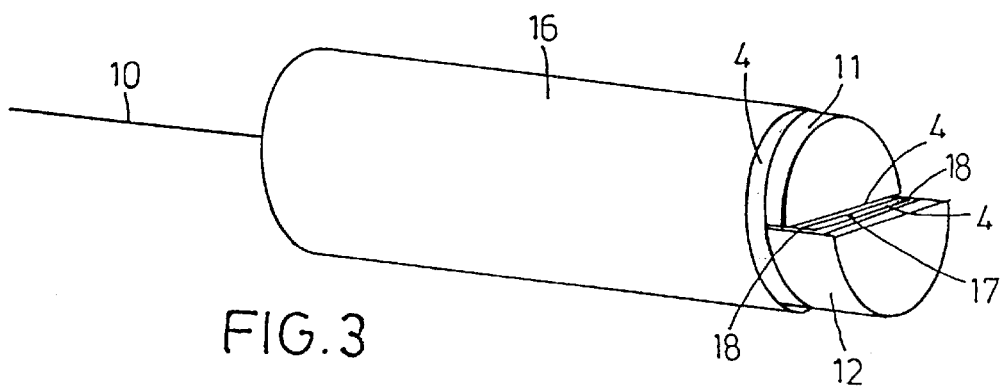
FIG. 3. is a schematic, partially broken-open perspective view of an electrolytic capacitor in a second embodiment of the present invention.
Figure 4:
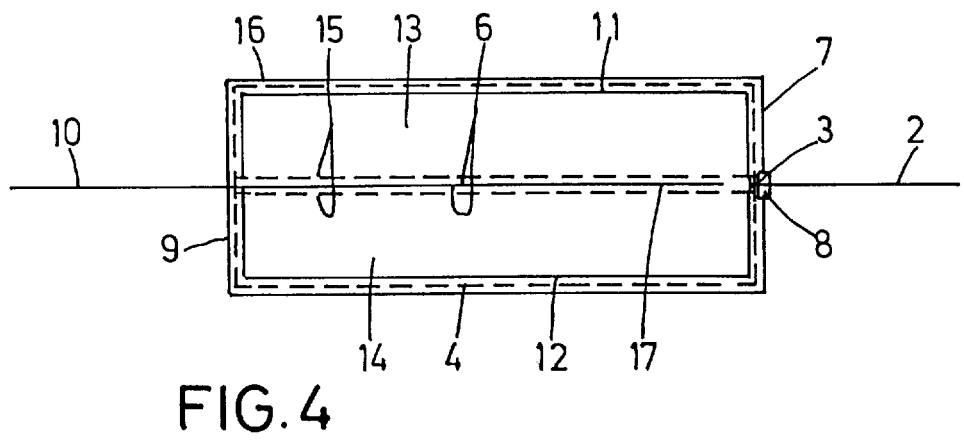
FIG. 4. is a schematic longitudinal axial section through the capacitor shown in FIG. 3, FIG. 5. is a schematic, partially broken-open perspective view of an aluminum electrolytic capacitor.

The second embodiment of an electrolytic capacitor in accordance with the invention represented in FIGS. 3 and 4 has a two-part molded anode which is composed of two semi-cylindrical tantalum anode shells 11, 12 with semi-cylindrical sinter anodes 13, 14 of tantalum powder placed in them. The anode parts are located, with the flat longitudinal sides 15 of the sinter anodes 13, 14 facing each other, in a cylindrical housing cup 16, again made of tantalum. Each tantalum anode shell 11, 12 with the sinter anodes 13, 14 is respectively again enveloped by a separating foil 4, whose structure and material corresponds to the embodiment in accordance with FIGS. 1 and 2. The separating foil 4 is again saturated with an aqueous electrolyte, for example a 1- or 2-molar sulfuric or phosphoric acid. A cathode foil 17 made of tantalum or titanium, which again has been provided on both sides with a fractal iridium coating 6 in the above discussed manner, is inserted as the cathode contact between the two longitudinal sides 15 of the sinter anodes 13, 14 and the sections of the separating foil 4 covering them. On its edge 18 extending along the inside of the housing cup 16, the cathode foil 17 is welded together with the housing cup 16.

The open side of the cathode cup 16 is again closed by a cover 7. A connecting wire 2 for contacting the divided tantalum anode 1 extends via an electrically insulating passage 8 into the housing interior, is branched on the inside of the passage 8 and leads to the two tantalum anode shells 11, 12. There the branched connecting wire 2 is connected with the tantalum anode shells in an electrically conducting manner.

A cathode connecting wire 10 is again fastened in an electrically conducting manner at the bottom 9 of the housing cup 16 in a central position in order to assure the current supply for the cathode foil 17. The latter is protected against a short circuit in respect to the divided tantalum anode 1 by the separating foil 4.

The embodiment represented in FIGS. 3 and 4 has the advantage that the divided anode can be molded without a binder by filling the tantalum anode shells 11, 12 with tantalum powder and sintering them in a high vacuum. In this way it is possible to increase the break-through voltage because of a reduced error probability.

Figure 5:
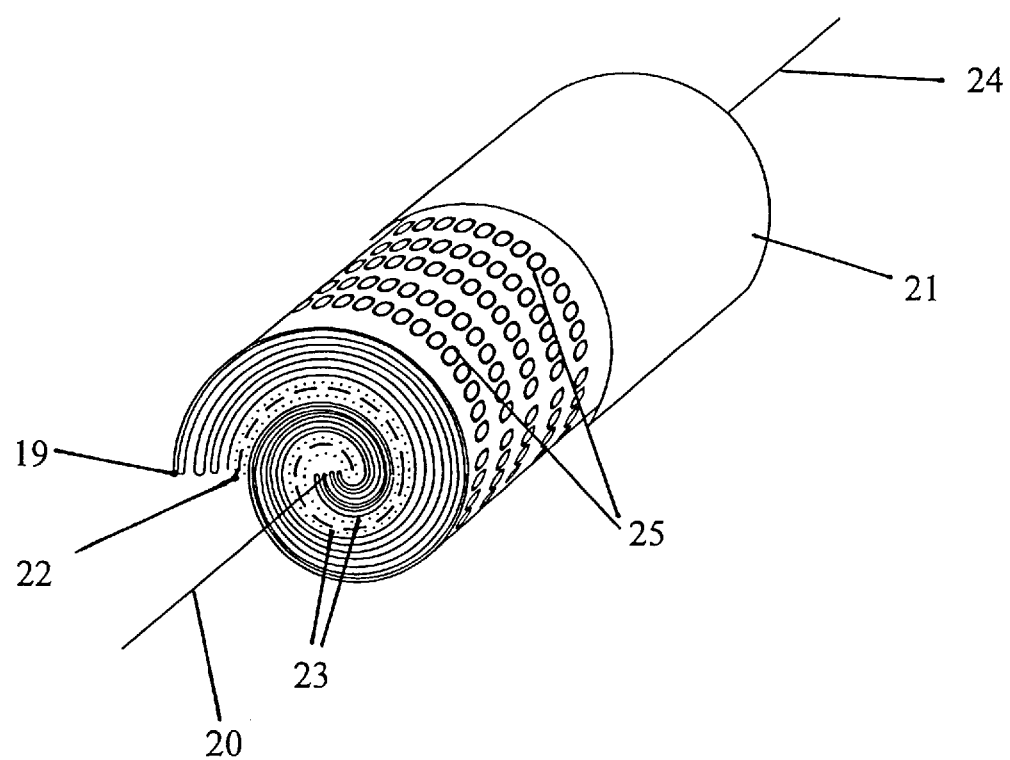

FIG. 5 represents an aluminum electrolytic capacitor as the preferred embodiment of the invention. An aluminum foil 19 is used as the anode of this, which is roughened in a manner known per se in chloride-containing etching solutions. This aluminum anode foil 19 is folded into several layers and is rolled up, together with a cathode contact foil 22 (shown by dashed lines), which is provided with a fractal iridium coating (not shown), along with the insertion of a separating foil 23 (shown in dots in FIG. 5) on both sides. The cathode foil 22 is connected in an electrically conducting manner with the housing cup 21, which is contacted via a connecting wire 24. The aluminum anode foil 19 is welded together with an anode wire 20 which is passed through the housing cup 21 in an electrically insulated manner analogously to the embodiment in accordance with FIG. 2. Incidentally, the aluminum anode foil 19 has perforations 25 which provide a good electrical contact between the electrolyte and the entire anode foil. It is furthermore advantageous that, with the capacitor in accordance with FIG. 5, good discharge properties are achieved by short diffusion paths because of the provided folding, winding and perforation of the anode and cathode foils.

Figure 6:
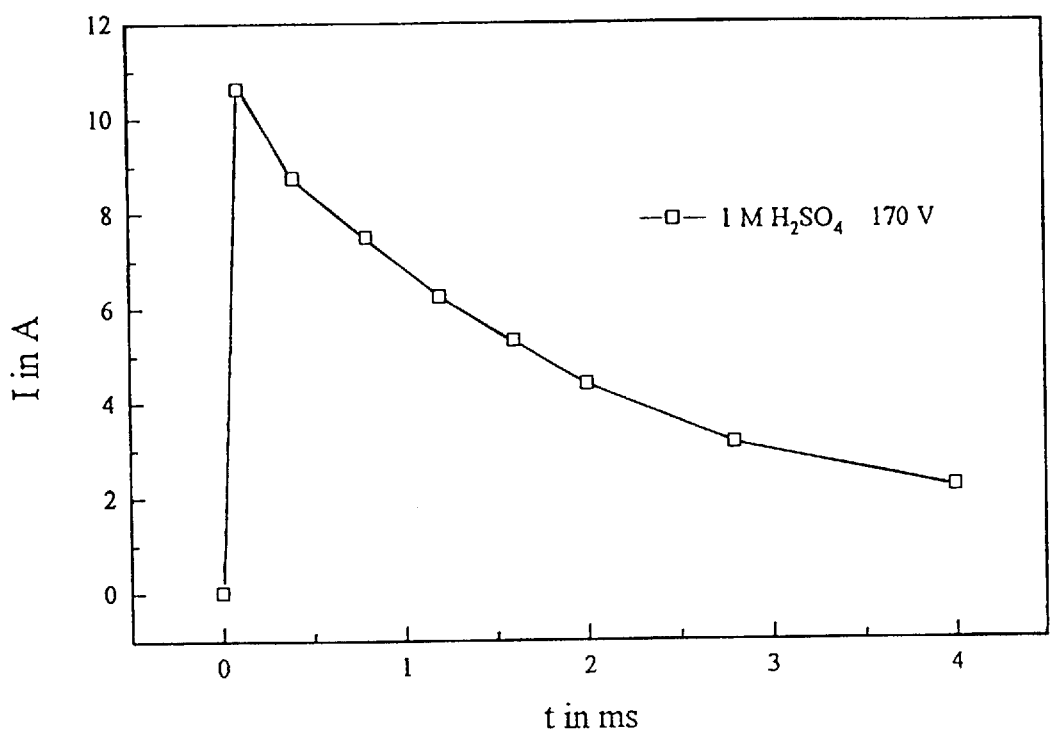
FIG. 6. is a graphic diagram of the discharge pulse of an electrolytic capacitor with a fractal coating of the cathode contact as a function of time.

FIG. 6 shows the discharge pulse of a tantalum electrolytic capacitor with a capacitance of 191 $\mu$F, having a fractal cathode contact and 1-molar sulfuric acid as the operating electrolyte. In this case the charge voltage was 170 V and the external load resistance 16 Ohms. The peak discharge current in this case achieved a value of more than 10 A.

The following comments should be made in conclusion:

The combination of a fractal iridium coating with the passivating substrate material titanium or tantalum for the cathode contact of the capacitor assures the stability over time of the cathode contact even in strongly acidic operating electrolytes, such as diluted sulfuric acid. Iridium has, as many platinum metals, a low hydrogen overvoltage. A titanium foil coated with iridium therefore does not reach the potential range of active titanium dissolution, even with an overload of the cathode contacts and beginning hydrogen generation.

It is furthermore necessary to pay attention to short diffusion paths in the sinter body in the course of the geometric construction of the capacitors. Also, the electrical series resistance $R_{ESR}$ of the electrolyte must be held as low as possible in order to achieve high discharge peak currents and good properties in connection with pulsed applications. Acidic electrolytes, such as diluted sulfuric or phosphoric acid, have a high conductivity here and are therefore particularly suitable for the tantalum electrolytic capacitors in accordance with the invention. In connection with aluminum capacitors, the above recited folding and winding in the manner discussed has advantageous effects on the discharge properties.

In summary it is possible by means of the combination of a tantalum sinter anode or etched aluminum foil with a fractally coated cathode contact to double the energy density of wet electrolyte capacitors in comparison with conventional constructions. Acidic electrolytes in connection with tantalum anodes or suitable folding and winding of an aluminum anode assure a low series resistance and good pulse behavior. The fields of employment of the capacitors in accordance with the invention therefore go beyond applications in biomedical technology—for example with implanted defibrillators—and also include flash apparatus, switching circuit elements, etc. The material combination of tantalum for the anode and iridium-tantalum or iridium-titanium for the cathode contact assures stability over a long time.

What is claimed is:

1. An electrolytic capacitor, comprising:
   a metal anode;
   a non-conducting insulating layer applied to the metal anode by forming the metal anode for producing a dielectric of the electrolyte capacitor;
   an electrolyte in liquid, pasty or solid form constituting a cathode of the electrolytic capacitor; and
   a flat cathode contact for supplying current to the electrolyte, wherein
   the flat cathode contact is provided with an electrically conducting, fractal surface coating.

2. The electrolytic capacitor in accordance with claim 1, wherein the fractal surface coating is a material selected from the group consisting of iridium, tantalum and aluminum.

3. The electrolytic capacitor in accordance with claim 1, wherein the flat cathode contact comprises a material selected from the group consisting of titanium, tantalum and aluminum.

4. An electrolytic capacitor comprising: a metal anode;
   a non-conducting insulating layer applied to the metal anode by forming the metal anode for producing a dielectric of the electrolytic capacitor;
   an electrolyte in liquid, pasty or solid form constituting a cathode of the electrolytic capacitor; and a flat cathode contact for supplying current to the electrolyte, wherein
   the flat cathode contact is provided with an electrically conducting, fractal surface coating; wherein the fractal surface coating is a material selected from the group consisting of iridium, tantalum and aluminum;
   wherein the fractal surface coating of the cathode contact is applied by cathode sputtering at a value of a pressure distance product during the cathode sputtering of approximately 0.5 mbar-cm.

5. An electrolytic capacitor, comprising: a metal anode;
   a non-conducting insulating layer applied to the metal anode by forming the metal anode for producing a dielectric of the electrolytic capacitor;
   an electrolyte in liquid, pasty or solid form constituting a cathode of the electrolytic capacitor; and
   a flat cathode contact for supplying current to the electrolyte, wherein
   the flat cathode contact is provided with an electrically conducting, fractal surface coating;
   further comprising a porous, electrically insulating separating foil saturated with the electrolyte and inserted between the molded metal anode and the flat cathode contact.

6. An electrolytic capacitor, comprising:
   a metal anode;
   a non-conducting insulating layer applied to the metal anode by forming the metal anode for producing a dielectric of the electrolytic capacitor;
   an electrolyte in liquid, pasty or solid form constituting a cathode of the electrolytic capacitor; and
   a flat cathode contact for supplying current to the electrolyte, wherein
   the flat cathode contact is provided with an electrically conducting, fractal surface coating;
   wherein the cathode contact is a cylindrical housing, cup (5) provided with the fractal surface coating on an interior thereof and into which the metal anode is inserted in an insulating manner with an electrolyte-saturated separating foil interposed therebetween, and wherein the metal anode is a cylindrical sinter anode made of tantalum powder.

7. The electrolytic capacitor in accordance with claim 6, wherein the sinter anode is connected with a connecting wire passed in an insulated manner through a cover of the housing cup, an end thereof at an anode side thereof is pressed into the sinter anode or connected with tantalum anode shells in an electrically conducting manner.

8. An electrolytic capacitor, comprising: a metal anode;
   a non-conducting insulating layer applied to the metal anode by forming the metal anode for producing a dielectric of the electrolytic capacitor;

an electrolyte in liquid, pasty or solid form constituting a cathode of the electrolytic capacitor; and a flat cathode contact for supplying current to the electrolyte, wherein the flat cathode contact is provided with an electrically conducting, fractal surface coating;

wherein the cathode contact includes a fractally coated cathode foil.

9. The electrolytic capacitor in accordance with claim 8, further comprising an electrolyte-saturated separating foil and a cathode cup into an interior which two tantalum anode shells with inserted sinter anodes made of tantalum powder have been inserted in an insulating manner, and wherein, the cathode contact comprises the cathode foil which is provided on both sides with the fractal coating and is arranged between two facing flat longitudinal sides of the anode and a respective interposition of the electrolyte-saturated separating foil.

10. The electrolytic capacitor in accordance with claim 9, wherein the cathode foil is welded on its edge with the cathode cup.

11. The electrolytic capacitor in accordance with claim 9, wherein the cathode cup is connected with a cathode connecting wire for the electrical contact with the cathode contact.

12. The electrolytic capacitor in accordance with claim 8, wherein said fractally coated cathode foil is disposed in a housing cup with the interposition of an electrolyte-saturated separating foil, wound together with the molded comprising a foil.

13. The electrolytic capacitor in accordance with claim 12, wherein the anode foil is wound such that the anode foil is folded upon itself into several layers.

14. The electrolytic capacitor in accordance with claim 13, wherein the anode foil is provided with perforations.

15. An electrolytic capacitor, comprising: a metal anode;

a non-conducting insulating layer applied to the metal anode by molding the metal anode for producing a dielectric of the electrolytic capacitor;

an electrolyte in liquid, pasty or solid form constituting a cathode of the electrolytic capacitor; and a flat cathode contact for supplying current to the electrolyte, wherein the flat cathode contact is provided with an electrically conducting, fractal surface coating;

wherein the anode is a sintered tantalum anode doped with nitrogen by means of a heat treatment process after sintering.

16. A process for producing a tantalum anode for an electrolytic capacitor in accordance with claim 15, comprising the steps:

charging the anode with a nitrogen atmosphere after sintering;

pumping out the nitrogen atmosphere, tempering the resulting tantalum anode at temperatures between 1000° and 2000° C. and at a process pressure on the order of magnitude of $10_{-5}$ mbar.

* * * * *